3,300,688
MAGNETIZING AND DEMAGNETIZING CIRCUIT HAVING A CONTROLLED SATURABLE CORE REACTOR
Robert E. Callihan, Danbury, Conn., assignor to Automation Industries, Inc., El Segundo, Calif.
Continuation of application Ser. No. 3,842, Jan. 21, 1960. This application Apr. 23, 1965, Ser. No. 450,302
10 Claims. (Cl. 317—123)

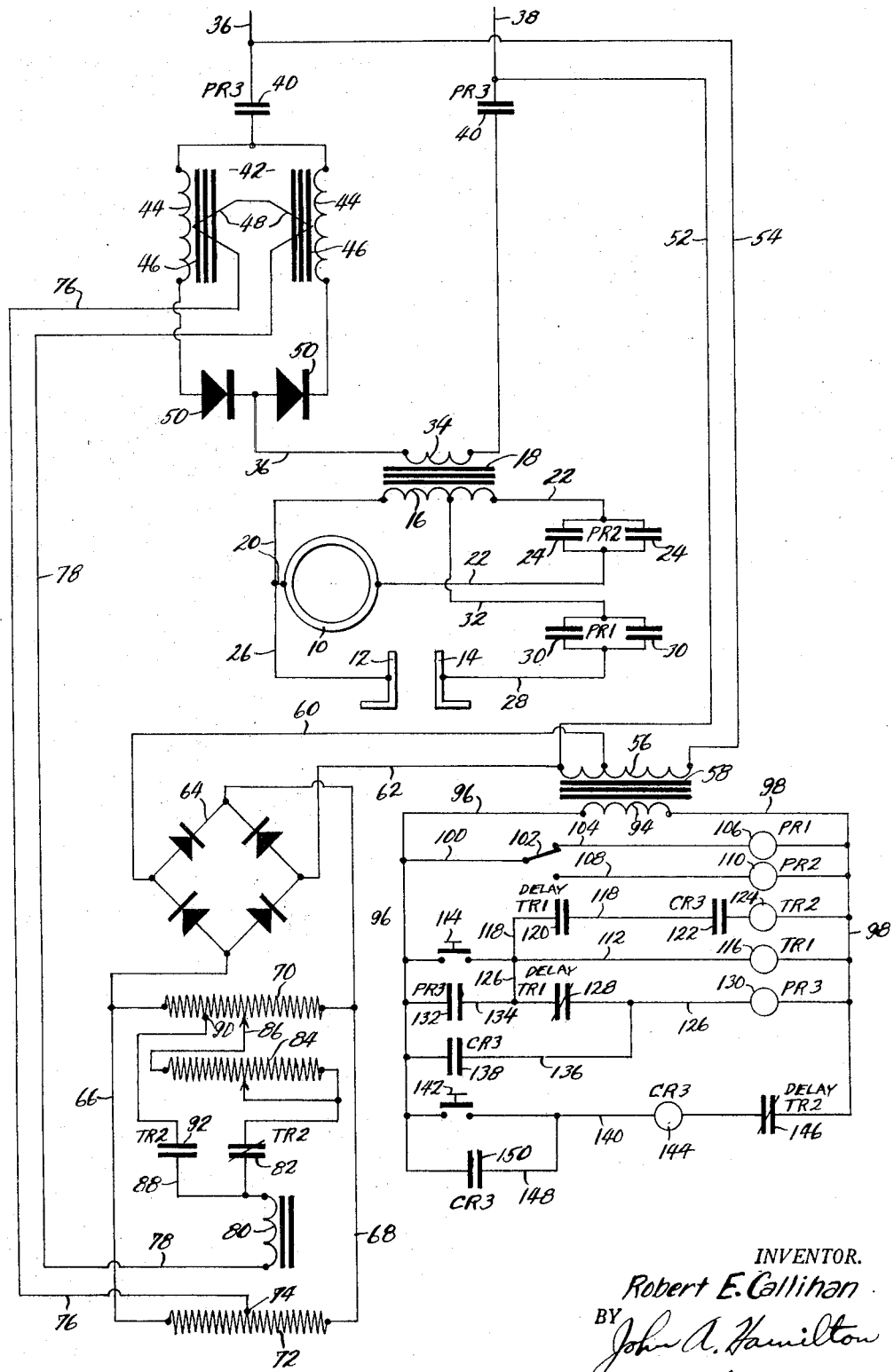

This invention relates to new and useful improvements in apparatus and methods for conducting magnetic particle testing procedures, and relates particularly to procedures in which paramagnetic particles are distributed over a magnetized part to detect surface or sub-surface cracks or other defects in said part. This application is a continuation of co-pending application for Apparatus and Method for Magnetic Testing, Ser. No. 3,842, filed January 21, 1960, in the name of Robert E. Callihan and assigned of record to Automation Industries, Inc., said co-pending application being forfeited in favor of this application.

One of the most common and commercially important methods of testing manufactured parts made of magnetizable metal for minute cracks or other defects or flaws is first to magnetize the part, and then to distribute paramagnetic particles over the surface thereof, as by dusting, flowing thereover a liquid medium in which the particles are suspended, dipping in such a liquid medium, or other suitable process. Any crack or other defect at or adjacent the surface of the part will cause a leakage or "fringing" of magnetic flux at that point. As a consequence, the particles will concentrate in the field and give a visual indication of the presence, location and extent of the defect.

The particles may be distributed over the surface of the part while said part is disposed within a magnetic field, or after the part has been removed from the magnetic field, in which case the residual magnetism remaining in the part affects the distribution of the particles. These two systems constitute the two general methods most commonly employed in tests of the kind under discussion. The present invention relates itself to both methods, but particularly the latter. Also, for reasons involving the eventual use of the part, it is usually desirable or necessary that the part be demagnetized subsequent to the test, and the present invention relates itself most specifically to the demagnetizing operation.

The heavy current necessary for the magnetizing operation is usually supplied by the secondary output of a power transformer, the primary circuit of said transformer being supplied from a suitable source of alternating current, the secondary circuit being passed either through a magnetizing coil, or supplied to a pair of heads between which the part to be tested is placed so as to form a leg of the circuit. A part placed axially in the coil will be magnetized so as to detect peripheral cracks or other defects, and a part placed between the heads will be magnetized so as to detect longitudinal cracks or defects.

The magnitude of the current required for magnetization depends on the size, configuration and other physical characteristics of the part to be tested, and therefore must be subject to accurate control for maximum efficiency of operation. In the past, this control has usually been effected by a voltage or current control device in the primary or secondary transformer circuits, such as a variable resistor, an auto-transformer in conjunction with a motorized tap-changing switch, or a continuously tapped auto-transformer. All of these devices are mechanical with moving parts, and hence subject to mechanical wear and failure, and require frequent maintenance and replacement. Also, the large current which must be handled makes the original cost of these components very high. Moreover, the tapped auto-transformer, which is in the most common use, will inherently provide current adjustments only in discrete steps, depending on the number of taps, not a continuous adjustment with an infinite number of settings. Since the current required depends on the characteristics of the part itself, it is difficult, if not impossible, to provide an auto-transformer with a sufficiently large number of taps to meet all requirements.

It is, therefore, one object of the present invention to provide a magnetizing current control which will provide a substantially continuous adjustment with an infinite number of positions, which has no moving parts in the portions thereof carrying the full operating current, and which therefore is not subject to mechanical wear or failure, and which is much more economical.

Generally, this object is accomplished by inserting a saturable core reactor in the primary transformer circuit. A saturable core reactor is essentially a variable reactance coil the output of which is varied by changing the amount of direct current flowing in a control winding about the core of the coil, thereby varying the degree of saturation of the core. The reactance and control windings involve no moving parts which could be subject to mechanical wear or failure, and the control current is quite small as compared to the main magnetizing current and may be controlled by relatively light and inexpensive equipment. A variable resistor in the control circuit provides continuous adjustment of the control voltage, and hence of the magnetizing current.

The usual manner of demagnetizing a part which has previously been magnetized by subjecting it to a magnetic field as previously described is first to subject it to a magnetic field equal to and disposed similarly to the field which originally produced the magnetization, then causing said field to decrease or decay slowly to zero. In the original magnetization, the field was interrupted relatively rapidly, thereby causing residual magnetism in the part. On the other hand, a slow decay of the field will demagnetize the part. In the past, the slow decay for demagnetization has been produced, for example, by motorizing the tap-changing switch of the auto-transformer controlling the magnetizing current, so as to gradually decrease the output to zero, or by other mechanical means. Not only was this method costly, involving heavy equipment in view of the large currents to be controlled, but also it was quite slow. For example, while for most parts a field decay time of perhaps one second would be ample for demagnetization, a heavy motorized tap-changing switch might require 15–20 seconds to perform the operation.

Accordingly, another object of the present invention is the provision of a demagnetizing circuit control wherein the magnetic field may be cause to decay slowly to zero with very simple and inexpensive controls, and as rapidly as may be consistent with complete demagnetization of the part. The accomplishment of this object also contemplates usage of the saturable core reactor previously discussed, and take advantage of the inherent characteristic of the reactor that its output will change only slowly responsively to even very rapid or instantaneous changes in its control voltage. Thus, the control voltage may be changed instantly from the voltage causing said reactor to produce full magnetizing current to the voltage necessary to cause said reactor to produce zero output, by means of a simple switching device, and the reactor output will nevertheless decay to zero sufficiently gradually to produce demagnetization of the part. The precise decay time is a characteristic of each individual reactor, and may be controlled by the physical design and structure thereof.

Another object is the provision of a device of the character described wherein the control circuit includes in parallel an adjustable resistor for providing the control voltage for magnetization, a fixed resistor for providing the control voltage for demagnetization, and switching means for inserting said resistors selectively in the circuit. This provides not only a simple and inexpensive means for providing the demagnetizing control voltage, but also permits demagnetization without necessity of changing the setting of the adjustable resistor. Thus, when preparing to demagnetize a part, there is no necessity for an operator to remember the original magnetizing voltage, or to reset the adjustable resistor, as the device is already preset. In other words, it provides the device with a "memory." This feature is also valuable when testing a large number of similar parts, since there is no requirement that the control voltage be set for each part.

A still further object is the provision of apparatus of the character described wherein the proper sequence and timing of all operations, on both the magnetizing and demagnetizing cycles, is controlled automatically by the pressing of a single actuating switch. In the magnetizing cycle, this involves closing the transformer primary circuit containing the reactor, maintaining it for a predetermined time sufficient to allow the magnetic field to be fully established, then interrupting the primary circuit so as to cause a relatively rapid decay of the reactor output. In the demagnetizing cycle, it involves the establishment and maintenance of the primary circuit as above, switching the reactor control voltage to the voltage necessary to reduce the reactor output to zero after an inherent delay, maintaining said control voltage for time at least as long as the decay period of the reactor, and then interrupting the primary circuit.

These and other features and advantages of the present invention will become readily apparent from the following detailed description of one embodiment thereof, particularly when taken in connection with the accompanying drawing wherein like reference numerals refer to like parts, and wherein the figure is a schematic wiring diagram of a magnetic tester embodying one form of the present invention.

Referring to the drawing in more detail, the numeral 10 represents a magnetizing coil in which a part to be tested may be supported axially. It will be understood that when a heavy current is passed through the coil, the part will be magnetized so that paramagetic particles later distributed over the surface thereof will concentrate about and give visual indication of peripherally extending cracks or other defects.

The numerals 12 and 14 indicate respectively a pair of heads between which a part to be tested may be placed to carry a heavy current applied between said heads. This causes magnetization of the part so that paramagetic particles later distributed over the surface thereof will detect longitudinal cracks or defects in the part. When a part is to be tested for both types of defects, it must of course be magnetized successively both in the coil and between the heads.

Coil 10 is connected across the secondary windings 16 of a power transformer 18 by means of wires 20 and 22, and the contacts 24 of a power relay designated PR2 are connected in series therewith.

Heads 12 and 14 are also connected across the secondary windings 16 in a circuit including wires 20 and 26, heads 12 and wire 14, wire 28, the contacts 30 of a power relay designated PR1, and wire 32. Relays PR1 and PR2 are of the multiple-contact type to provide capacity for, and avoid damage by the heavy currents conducted thereby. It will be apparent that when transformer 18 is energized, current will be applied selectively either to heads 12 and 14, or to coil 10, depending on whether contacts 30 or contacts 24 are closed.

The primary winding 34 of transformer 18 is connected to and energized by a pair of alternating current line wires 36 and 38. In each of said wires is connected a pair of contacts 40 of a power relay designated PR3. Inserted in wire 36 is a saturable core reactor designated generally by the numeral 42. Basically, a saturable core reactor as shown comprises a reactor coil 44, a core 46, and a direct current control winding 48. The magnitude of the direct current flowing in winding 48 varies the magnetic saturation of core 46, and controls the reactance or impedance of coil 44.

Coil 44 thus acts as a throttle controlling the amount of power delivered to transformer 18, and hus the magnetizing current eventually delivered to coil 10 or heads 12 and 14. It will be understood that the greater the direct current allowed to pass through control winding 48, the greater the output of the reactor will be. In the particular embodiment shown, the reactor comprises two reactor coils 44 connected in parallel, with a rectifier 50 connected in series with each coil, so that each coil conducts a uni-directional half-wave current. This renders the coils "self-saturating," and provide a greater output with lighter, less bulky and less expensive equipment.

Control current for supplying direct current to control windings 48 of the reactor, and for other control operations to be described, is supplied by a pair of wires 76 and 78 connected to line wires 36 and 38 ahead of contacts 40, wires 52 and 54 supplying the primary winding 56 of a step-down transformer 58.

Tapped off of the primary winding 56 are a pair of wires 60 and 62 which supply alternating current to a rectifier network 64 which in turn functions to supply a uni-directional voltage across the output wires 66 and 68 of the rectifier network. Connected in parallel across wires 66 and 68 are a pair of resistors 70 and 72. Connected across said resistors is a circuit including in series a fixed tap 74 on resistor 72, wire 76, control windings 48 of reactor 42, wire 78, choke coil 80, a pair of normally closed contacts 82 of a time delay relay designated TR2, a variable resistor 84 of relative high value as compared to resistors 70 and 72, and a slider contact 86 on resistor 70.

It will be readily apparent that by moving slider 86 along resistor 70, any desired direct current voltage, both as to direction and magnitude, may be supplied to reactor control windings 48, in order to regulate the reactor output and hence to control the current supplied to coil 10 or heads 12 and 14. Adjustable resistor 84, by its adjustment, is used to initially establish a selected range of output currents from transformer 18. Choke coil 80 functions to suppress harmonic frequencies which may be established in the control circuit and which would interfere with the stability of operation of the reactor.

A by-pass circuit around contacts 82 and resistor 84 is provided by a wire 88 having a fixed tap connection 90 to resistor 70, and having interposed therein a pair of normally open contacts 92 of TR2. It will be understood that when contacts 82 are opened and contacts 92 are closed, as will be described, the circuit of windings 48 will flow through by-pass conductor 88, and that the resistances of this by-pass circuit are pre-set to supply to the control windings the voltage necessary to cause reactor 42 to produce a zero output. This voltage is a built-in characteristic of the reactor itself, and once determined, need not be adjusted.

The secondary winding 94 of transformer 58 supplies alternating current for control purposes to a pair of wires 96 and 98. Connected to wire 96 by wire 100 is the movable contact of a selector switch 102. Said movable contact is manually operable selectively to complete a circuit to wire 98 through a wire 104 in which is interposed the operating coil 106 of relay PR1, or through a wire 108 in which is interposed the operating coil 110 of relay PR2. It will be understood that contacts 30 close immediately on energization of coil 106, and that contacts 24 close immediately on energization of coil 110, thereby connecting either coil 10 or heads 12 and 14 in the secondary circuit of transformer 18.

Connected across wires 96 and 98 is a wire 112 in which is interposed, in series, a momentary closure push-button switch 114 and the operating coil 116 of a time-delay relay designated TR1. Connected so as to by-pass coil 116 is a wire 118 in which is interposed, in series, a pair of normally open contacts 120 of TR1, a pair of normally open contacts 122 of a control relay designated CR3, and the operating coil 124 of relay TR2. Connected also so as to by-pass coil 116 is a wire 126 in which is interposed in series a pair of normally closed contacts 128 of TR1, and the operating coil 130 of PR3.

A pair of normally open contacts 132 of PR3 are disposed in a wire 134 by-passing push-button switch 114. A wire 136 is disposed to complete a circuit to coil 130 independently of contacts 132 or 128, and includes the normally open contacts 138 of control relay CR3. A wire 140 is connected between wires 96 and 98, and includes in series a momentary-closure push-button switch 142, the operating coil 144 of CR3, and a pair of normally closed contacts 146 of TR2. Switch 142 is by-passed by a conductor 148 in which is interposed a pair of normally open contacts 150 of CR3.

When coil 116 of relay TR1 is energized its contacts 120 and 128 do not operate for a predetermined time delay, this delay being built into the relay and being sufficiently long to permit the magnetic field of coil 10 or heads 12 and 14 to be fully established after the closing PR3 contacts 40. At the expiration of this delay, say for example one-half second, contacts 120 close and contacts 128 open.

When the coil 124 of relay TR2 is energized, contacts 82 thereof open immediately and contacts 92 close immediately, but contacts 146 thereof remain closed for a predetermined time delay greater than the time required for the output of reactor 42 to be reduced to zero after the control winding of voltage has been changed to the value necessary to produce the change. For example, if the reactor decay period is one second, contacts 146 may be set to open two seconds after coil 124 is energized. When coil 130 of relay PR3 is energized, all of its contacts 40 and 132 close immediately. When coil 144 of relay CR3 is energized, all of its contacts 122, 138 and 150 close immediately.

In operation, to magnetize a part said part is first disposed either within coil 10, or between heads 12 and 14, depending on the direction of magnetization desired, and selector switch 102 is operated to energize either coil 106 or 110 whereby to close either contacts 30 or contacts 24 to complete the secondary circuit of transformer 18 to coil 10 or the heads 12 and 14, as desired. Slide contact 86 of resistor 70 is set so as to energize the reactor control coils 48, so that the reactor, when energized, will supply proper voltage to the primary of transformer 18 to cause the desired current in the secondary.

Next, switch 114 is closed momentarily, thereby completing an operating circuit to coil 116 of relay TR1. The energization of this coil has no immediate effect, however, due to the time delay factor in the operation of contacts 120 and 128 of TR1. When switch 114 is closed, it also completes an operating circuit to coil 130 of relay PR3 through wires 112 and 126 and contacts 128 of relay TR1. The energizing of coil 130 causes contacts 40 to close, thereby completing the primary circuit of transformer 18, whereby current flows through coil 10 or between heads 12 and 14, establishing a magnetic field to magnetize the part. Energizing coil 130 also closes contacts 132 of PR3, thereby establishing an interlock circuit through contacts 132 and wires 134, 126 and 112 to keep coil 116 of TR1 and coil 130 of PR3 energized even after switch 114 is released and thereby opened.

After a preset lapse of time, sufficient to permit the magnetic field of coil 10 or heads 12 and 14 to be fully established and the part magnetized, said time relay being determined by the time characteristic of TR1 and being for example about one-half second, contacts 128 of TR1 open. This interrupts the circuit to coil 130 of PR3, allowing contacts 40 to open to interrupt the primary circuit of transformer 18, and also allows contacts 132 to open.

Opening of contacts 132 interrupts the circuit to coil 116 of TR1 whereupon contacts 128 again close, and the system is at rest. The decay of the output of reactor 42 responsive to the opening of PR3 contacts 40 is quite rapid, whereby residual magnetism will be left in the part supported in coil 10 or between heads 12 and 14, so that when paramagnetic particles are distributed thereover, they will concentrate about cracks or defects of the part in the test procedure already discussed. By delaying the opening of contacts 128 still further, or in some circumstances even in the delay period of TR1, it will be apparent that the test could be conducted with the part still in the magnetic field.

When a previously magnetized part is to be demagnetized, it is placed either in coil 10 or between heads 12 and 14, in the same position in which it was previously magnetized, and slider 86 is set in the same position it occupied during the original magnetization, then switch 142 is closed momentarily. This completes a circuit from wire 96 through switch 142, coil 144 of CR3, and normally closed contacts 146 of TR2 to wire 98. Coil 144, thus energized, closes its interlock contacts 150 to by-pass switch 142 and keep coil 144 energized even after switch 142 is released, and also closes its contacts 122 and 138. Closing contacts 122 has no effect at this time, since contacts 120 are open.

Closing contacts 138 completes a circuit through wires 136 and 126 to coil 130 of PR3, and through wires 136 and 126, contacts 128 of TR1, and wires 126 and 112 to coil 116 of TR1. This establishes the full magnetizing current as previously described, coil 130 closing contacts 40 to close the primary circuit of transformer 18, and also closing its contacts 132. Coil 116, after its predetermined time delay sufficient to allow the magnetic field in the test part to be fully established (one-half second in the example given), opens contacts 128 and closes contacts 120. Opening contacts 128 has no immediate effect, however, since PR3 coil 130 is now energized through contacts 138, and TR1 coil 116 is now energized through contacts 132.

The closing of contacts 120 completes a circuit through contacts 132, wires 134, 126 and 118, contacts 120, contacts 122 (now closed), and coil 124 of relay TR2. Coil 124, thus energized, opens contacts 82 and closed contacts 92, thereby supplying to control windings 48 of reactor 42 a voltage such that the output of the reactor will decay or be reduced to zero, and causing the magnetic field in the test part to be correspondingly slowly reduced or decayed. This slow decay of the field will demagnetize the test part, while as previously described the relatively rapid decay produced by opening contacts 40 while the full magnetizing current is flowing will leave the test part residually magnetized.

The slow output decay of the reactor responsive to even a substantially instantaneous change in the voltage supplied to its control winding is an inherent characteristic of saturable core reactors. The utilization of this characteristic is an important and valuable feature of the present invention, since it permits the elimination of expensive motor-driven tap-changing switches or other mechanical time-delay apparatus, which apparatus must be extremely heavy when handling amperages such as are commonly involved in this operation, and permits the use of a simple instantaneous-operation switch composed of contacts 82 and 92.

Furthermore, even this simplied switching gear may be relatively light and inexpensive, since it does not handle the full magnetizing current, but only the greatly reduced current of control windings 48. Also, this means of providing slow decay of a magnetic field has the advantage of extreme speed as compared, for example, to a motor driven tap-changing switch as previously described. For example, while a decay period of one second is ample in most cases to provide full demagnetization of a part, and while a reactor having this or even a shorter decay period can easily be provided, a motor driven switch may require 15–20 seconds for the same operation.

After TR2 coil 124 has been energized to switch contacts 82 and 92, contacts 146 will open after a predetermined time delay which is a design function of the relay and which must be greater than the decay period of reactor 42. Opening of contacts 146 de-energizes coil 144, which opens interlock contacts 150, opens contacts 122 which de-energizes coil 124 and thereby returns TR2 contacts 82, 92 and 146 to their normal positions, and opens contacts 138 which de-energizes coil 130 of PR3. This causes contacts 132 to open which de-energizes coil 116 of TR1 and returns TR1 contacts 120 and 128 to their normal status, and the system is at rest.

It will be seen that the use of contacts 82 and 92 for supplying alternative magnetizing and demagnetizing control voltages to reactor windings 48 provides an apparatus with a "memory" in that when successively magnetizing and demagnetizing a series of like test parts, the slider 86 need never be adjusted or changed. In previous devices, it has been customary to demagnetize by operating the current throttling adjustment means to reduce the magnetizing current gradually to zero, with the result that the adjustment means had to be manually returned to its original setting before the next part could be magnetized. With the present apparatus, it is not necessary ever to move the slider 86, and there is no necessity that the operator recall or readjust a setting before magnetizing the next best part.

While only a single embodiment of the present invention has been disclosed herein, it will be readily apparent to those skilled in the art that numerous changes and modifications may be made thereto without departing from the spirit of the present invention. Accordingly, the accompanying drawings and description thereof are for illustrative purposes only and do not in any way limit the present invention which is defined only by the claims which follow.

I claim:

1. A magnetizing and demagnetizing apparatus comprising
 a power circuit operable to magnetize an object when said circuit is energized and to leave said object residually magnetized when said power circuit is interrupted relatively rapidly and to demagnetize said object when the current in said power circuit is relatively slowly reduced to a negligible amount,
 first switch means operable to interrupt said power circuit,
 a variable reactance coil in said power circuit, said coil having a core with a control winding thereabout, the current allowed by said reactor to flow in said power circuit being determined by the current allowed to flow in said control winding,
 a normally closed first regulating circuit operable to supply a variable current to said control winding of a magnitude that permits the flow of a controlled current in said power circuit,
 a normally open second regulating circuit operable when closed to supply current to said control winding of the value necessary to reduce to a low value the current flowing in said power circuit,
 second switch means operable when energized to open said first regulating circuit and close said second regulating circuit, and
 operating means for selectively opening said first switch means or energizing said second switch means.

2. An apparatus as recited in claim 1 wherein
 said operating means includes a first manual means operable when actuated to close said first switch means and after a predetermined time delay to reopen said first switch means, and
 a second manual means operable when actuated to close said first switch means and to energize said second switch means after a predetermined time delay.

3. An apparatus as recited in claim 1 wherein
 said operating means includes a first manual means operable when actuated to close said first switch means and after a predetermined time delay to reopen said first switch means, and
 a second manual means operable when actuated to close said first switch means, to energize said second switch means after a predetermined time delay and to reopen said first switch means after a still further predetermined time delay.

4. A demagnetizing apparatus comprising
 a power circuit having therein means for establishing a magnetic field about a part to be demagnetized when said circuit is energized,
 a variable reactance coil in said power circuit coupled to a core with a control winding thereabout, the reactance of said coil being regulated to control the current in said power circuit by the magnitude of current flowing in said control winding,
 first switch means operable to interrupt said power circuit,
 a normally closed first regulating circuit supplying a variable current to said control winding of a value to permit the flow of current in said power circuit,
 a normally open second regulating circuit operable when closed to supply current to said control winding of a value to cause the flow of current in said power circuit to be reduced to a low value,
 second switch means operable when energized to open said first regulating circuit and close said second regulating circuit, and
 operating means for closing said first switch means, then energizing said second switch means after a predetermined time delay, and then re-opening said first switch means after a still further predetermined time delay.

5. A magnetizing and demagnetizing circuit having means arranged to magnetize a test part when said circuit is energized and to leave said part residually magnetized when said circuit is interrupted relatively rapidly and said part is demagnetized when the current in said circuit is reduced relatively slowly,
 control means for controlling said circuit to cause selectively either a relatively rapid or a relatively slow decrease of the current flowing therein,
 switch means in said control means operable to interrupt said circuit,
 a variable reactance coil in said circuit coupled to a core with a control winding thereabout,
 means for supplying a variable current to said control winding to vary the saturation of said core and the reactance of said coil, said means being adjustable to produce a current of low value in said circuit,
 a first operating means operable when actuated to close said switch means, and after a predetermined time delay to reopen said switch means, and a second operating means operable when actuated to close said switch means, and after a predetermined time to adjust the current in said control winding to the value necessary to reduce the current in said circuit to said low value.

6. A magnetic tester for testing a workpiece including the combination of
 current alternating means adapted to be coupled to said workpiece and to produce an alternating magnetizing current for producing an alternating magnetic field in said workpiece, magnetizing control means in said current means effective to abruptly reduce the magnitude of the magnetizing current sufficiently fast to leave a large amount of residual magnetism in the workpiece, a magnetic core coupled to at least one of said means whereby the magnitude of the magnetizing current is a function of the magnetic flux saturation in said core, and demagnetizing control means coupled to said core to slowly vary the amount of magnetic flux in the core to slowly reduce the alternating magnetizing current to a negligible amount whereby said workpiece is demagnetized and substantially free of residual magnetism.

7. A magnetic tester for testing a workpiece including the combination of current means adapted to be coupled to said workpiece and effective to produce a magnetizing current whereby a magnetic flux field is created in said workpiece, saturable core means coupled to said current means and effective to control the magnitude of said magnetizing current as a function of the flux density in said core, magnetizing control means coupled to said current means and effective to rapidly reduce the magnetizing current at a sufficiently high rate to leave a large amount of residual magnetism in the workpiece, a control winding coupled to the core to produce a magnetic flux field in the core, demagnetizing control means coupled to the winding to circulate a control current through the control winding, said last means being effective to gradually vary the magnitude of the control current and therefore the amount of magnetic saturation of said core to reduce the magnitude of the magnetizing current to a negligible amount at a sufficiently slow rate to demagnetize the workpiece and leave it substantially free of any residual magnetism.

8. A magnetic tester for testing a workpiece including the combination of first current means adapted to be coupled to said workpiece to produce a magnetic field in said workpiece, control means coupled to the current means to reduce the magnetizing current at a sufficiently fast rate to leave a large amount of residual magnetism in said workpiece, an inductive winding in said current means to form an impedance that reduces the magnitude of the magnetizing current, a core of magnetic material inductively coupled to said winding, a control winding inductively coupled to the core to produce a magnetic flux field in said core, and second current means coupled to the control winding and effective to saturate the core and reduce the impedance of the winding, said second current means being effective to gradually decrease the current in said winding to reduce the flux field in the core and reduce the magnetizing current at a corresponding rate to a negligible amount.

9. A magnetic tester for testing a workpiece including the combination of an alternating current source, a transformer in said source including a primary winding and a secondary winding, said secondary winding being effective to produce an alternating magnetizing current, means coupling said secondary to said workpiece whereby the magnetizing current creates an alternating magnetic field in said workpiece, means in said current source for abruptly disrupting said magnetizing current whereby the magnetic field is abruptly terminated and said workpiece retains a residual magnetism, a saturable core in said current source, the magnetude of said magnetizing current being a function of the amount of magnetic flux in said core, a control winding coupled to the core for producing a flux field in the core, a demagnetizing current source coupled to the control winding for varying the amount of flux in the core, said demagnetizing current source being effective to reduce the magnetizing current at a sufficiently low rate to substantially eliminate residual magnetism in the workpiece.

10. A magnetic tester for testing a workpiece including the combination of a transformer having a primary and a secondary effective to produce an alternating magnetizing current, means coupling said secondary to said workpiece whereby an alternating magnetic field is created in said workpiece, means coupled to said transformer for abruptly disrupting said magnetizing current whereby the magnetic field is abruptly terminated and said workpiece retains a large amount of residual magnetism, a saturable core reactor coupled to the primary, said reactor having an impedance which is a function of the amount of magnetic flux in said core, a control winding coupled to the core for producing a magnetic flux field in the core whereby the impedance of said reactor is varied and the magnetizing current is varied, and control means coupled to said control winding for varying the magnetic flux field whereby the magnetizing current is decreased at a sufficiently low rate to substantially eliminate any residual magnetism in the workpiece.

References Cited by the Examiner

UNITED STATES PATENTS

| | | | |
|---|---|---|---|
| 2,677,800 | 5/1954 | Phillips | 323—89 |
| 2,871,417 | 1/1959 | Connoy | 317—123 |
| 3,034,021 | 5/1962 | Callihan | 324—38 |
| 3,078,396 | 2/1963 | Engelsted | 317—157.5 |

MILTON O. HIRSHFIELD, *Primary Examiner.*

MAX L. LEVY, *Examiner.*

J. A. SILVERMAN, *Assistant Examiner.*